US011206093B2

(12) United States Patent
Gao et al.

(10) Patent No.: US 11,206,093 B2
(45) Date of Patent: Dec. 21, 2021

(54) PROPAGATION PATH SEARCH METHOD AND APPARATUS

(71) Applicant: HUAWEI TECHNOLOGIES CO., LTD., Guangdong (CN)

(72) Inventors: Yuefan Gao, Chengdu (CN); Xiaolong Li, Chengdu (CN); Can Wang, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/887,387

(22) Filed: May 29, 2020

(65) Prior Publication Data

US 2020/0295856 A1    Sep. 17, 2020

Related U.S. Application Data

(63) Continuation of application No. PCT/CN2018/114582, filed on Nov. 8, 2018.

(30) Foreign Application Priority Data

Nov. 30, 2017 (CN) .......................... 201711245683.7

(51) Int. Cl.
*H04B 17/391* (2015.01)
*H04W 16/28* (2009.01)
*H04W 84/04* (2009.01)

(52) U.S. Cl.
CPC .......... *H04B 17/391* (2015.01); *H04W 16/28* (2013.01); *H04W 84/042* (2013.01)

(58) Field of Classification Search
CPC ............... H04B 17/319; H04B 17/373; H04B 17/3912; H04B 17/3913; H04B 17/0082;
(Continued)

(56) References Cited

U.S. PATENT DOCUMENTS

| 5,949,988 A | 9/1999 | Feisullin et al. |
| 2011/0281526 A1 | 11/2011 | Matsuda et al. |

(Continued)

FOREIGN PATENT DOCUMENTS

| CN | 101592690 A | 12/2009 |
| CN | 103391139 A | 11/2013 |

(Continued)

OTHER PUBLICATIONS

Tan Jundong et al: "A Full 3-D GPU-based Beam-Tracing Method for Complex Indoor Environments Propagation Modeling", IEEE Transactions On Antennas and Propagation, IEEE Service Center, Piscataway, NJ, US, vol. 63, No. 6, Jun. 1, 2015 pp. 2705-2718, XP011582889.

(Continued)

*Primary Examiner* — Thanh C Le
(74) *Attorney, Agent, or Firm* — Womble Bond Dickinson (US) LLP

(57) ABSTRACT

Embodiments of the present invention disclose a propagation path search method. In one embodiment, the method includes: defining a target three-dimensional object, where the target three-dimensional object is configured to describe full space; setting a signal transmission point in internal space of the target three-dimensional object to perform initial beam modeling of a signal point source, where the signal transmission point is used to transmit an initial beam; tracking the initial beam to determine a propagation manner generated by the initial beam in the three-dimensional object; and determining that a path corresponding to a target beam is an effective path when the target beam reaches a signal receiving point, where the target beam is included in the initial beam, or is obtained after the initial beam is split or changed.

20 Claims, 9 Drawing Sheets

A triangular pyramid forms transmission source sphere space to form an initial beam Signal transmission source

(58) Field of Classification Search
CPC ..... G01S 5/0252; H04W 16/18; H04W 16/22;
H04W 16/26; H04W 16/28; H04W 24/06;
H04W 84/042
See application file for complete search history.

(56) References Cited

U.S. PATENT DOCUMENTS

| | | |
|---|---|---|
| 2014/0257779 A1 | 9/2014 | Yoon et al. |
| 2016/0037357 A1 | 2/2016 | Barbosa Da Torre et al. |
| 2018/0062770 A1* | 3/2018 | Reial ..................... H04W 16/28 |
| 2018/0278349 A1 | 9/2018 | Zhihua et al. |
| 2018/0331794 A1* | 11/2018 | Nagaraja ............... H04B 7/0695 |
| 2020/0045725 A1* | 2/2020 | Mochizuki .......... H04W 72/046 |
| 2020/0275402 A1* | 8/2020 | Shi ........................ H04W 4/025 |

FOREIGN PATENT DOCUMENTS

| | | |
|---|---|---|
| CN | 104112293 A | 10/2014 |
| CN | 105372676 A | 3/2016 |
| CN | 105430740 A | 3/2016 |
| CN | 106209264 A | 12/2016 |
| RU | 2170492 C2 | 7/2001 |

OTHER PUBLICATIONS

Juho Poutanen et al: "Multi-Link MIMO Channel Modeling Using Geometry-Based Approach", IEEE Transactions On Antennas and Propagation, IEEE Service Center, Piscataway, NJ, US, vol. 60, No. 2, Feb. 1, 2012 pp. 587-596, XP011403478.

\* cited by examiner

PROPAGATION PATH SEARCH METHOD AND APPARATUS

CROSS-REFERENCE TO RELATED APPLICATIONS

This application is a continuation of International Application No. PCT/CN2018/114582, filed on Nov. 8, 2018, which claims priority to Chinese Patent Application No. 201711245683.7, filed on Nov. 30, 2017. The disclosures of the aforementioned applications are herein incorporated by reference in their entireties.

TECHNICAL FIELD

Embodiments of the present invention relate to the field of wireless communication, and in particular, to a propagation path search method and apparatus.

BACKGROUND

With the development of 5G industry, a brand new spectrum (such as 28 GHz and 39 GHz) is applied to an air interface. A small coverage distance (high-frequency coverage distance is generally within 500 meters) and complex deployment scenarios pose new requirements for wireless network planning. In the fields of network site planning and radio signal simulation, an accurate radio signal propagation path loss model is required. A ray tracing model is considered to be one of key technologies for accurately predicting signal propagation path loss. After a radio signal is transmitted by a transmitter antenna, the signal is mainly transferred to a user receiver in five manners: collineation, transmission, reflection, diffraction and scattering. Generally, the ray tracing model is used to simulate five types of signal propagation manners. Researches into the ray tracing model are usually divided into four operations shown in FIG. 1. Operation 102 is a basic module in the ray tracing propagation model. Path search accuracy directly affects radio signal prediction accuracy. Operation 102 is also the most time-consuming, which usually accounts for 70% to 90% of entire model calculation.

In the prior art, by performing a signal path sampling modeling on the transmitter, a specific data quantity of initial rays (ray) are transmitted outward to track a propagation path of each ray to obtain a collineation path, a transmission path, a reflection path, a diffraction path and a scattering path of a signal. If the ray reaches a receiving point, a signal propagation path is generated; if the ray does not reach the receiving point, a wireless path is generated.

However, in the prior art, the initial ray sampling has a sampling density problem, a full space propagation effect of the signal cannot be accurately reflected, and there is a case in which not all paths are found. For example, if ray sampling is performed at every 1°, a quantity of initial sampled rays is 64800. As a ray propagation distance increases, a gap between rays also increases synchronously. When the ray propagates to 500 m, a gap between the initial rays is 8.7 m. The gap will cause the path loss, reducing accuracy.

SUMMARY

Embodiments of the present invention provide a propagation path search method and apparatus, used for solving a problem in the prior art of path loss due to increased distance, and improving accuracy of a propagation model.

A first aspect of the invention provides a propagation path search method, including: defining a target three-dimensional object, where the target three-dimensional object is configured to describe full space; setting a signal transmission point in internal space of the target three-dimensional object to perform initial beam modeling of a signal point source, where the signal transmission point is used to transmit an initial beam; tracking each initial beam to obtain a propagation manner of each initial beam in the three-dimensional object; and determining that a path corresponding to a target beam is an effective path when the target beam reaches a signal receiving point, where the target beam is included in each initial beam, or is obtained after the initial beam is split or changed. In this aspect, a full space path search capability is constructed by beaming. Because there is spatial correlation between adjacent rays, computing efficiency can be greatly improved by turning the ray into a beam, that is, a beam. Moreover, all rays in the full space may be described by beaming, and more propagation path may be found, ensuring that the path loss does not occur when the distance increases with the computation efficiency.

In one embodiment, the propagation manner includes collineation, reflection, diffraction, transmission, or scattering.

In one embodiment, after the tracking each initial beam and before the determining that a path corresponding to a target beam is an effective path, the method further includes: performing modeling based on the propagation manner.

In one embodiment, when the propagation manner is diffraction, the performing modeling based on the propagation manner includes: obtaining a diffraction face that uses a diffraction edge as a normal line and that passes the signal transmission point; using a circle that is centered at an intersection of the diffraction edge and the diffraction face and that passes the signal transmission point as a diffraction circle; transmitting a ray from the signal transmission point through two ends of the diffraction edge to obtain a beam face, where the beam face is located on the other side of the signal transmission point relative to the diffraction edge; moving the signal transmission point on the diffraction circle to obtain infinite corresponding beam faces; and using space formed by the infinite beam faces as space in which a new beam generated after diffraction is located, where the new beam generated after diffraction includes at least one beam.

In one embodiment, when the propagation manner is reflection, the performing modeling based on the propagation manner includes: determining a shielding face, where the shielding face is used to reflect a beam transmitted from the signal transmission point; determining space formed by the beam before reflection as beam space, where a contact face between the beam space and the shielding face is an end face of the beam space, and a portion of beam' space on the same side as effective beam space is effective beam' space; performing space mirroring on the beam space based on the shielding face to obtain the beam' space, where a contact face between the beam' space and the shielding face is a start face of the beam' space, and the portion of the beam' space on the same side as the effective beam space is the effective beam' space; and reflecting the beam transmitted by the signal transmission point on the shielding face to obtain reflection space, where the reflection space includes the effective beam space and the effective beam' space.

In one embodiment, when the propagation manner is transmission, the performing modeling based on the propagation manner includes: extending a transmitted beam and intersecting the transmitted beam with a first face of a building, where the transmitted beam is a beam of the end face on a second face of the building, the first face and the second face are faces of the building, and the first face and the second face are different faces.

In one embodiment, when the propagation manner is scattering, the performing modeling based on the propagation manner includes: using the initial beam of the signal point source to separately perform modeling on the signal transmission point and the signal receiving point to obtain a scattering face, where the scattering face is an intersection set of a signal transmission point model and a signal receiving point model in a visible area of a shielding face; constructing, based on the signal transmission point and the signal receiving point, a first pyramid and a second pyramid by using the scattering face as a bottom face, where the signal transmission point is a vertex of the first pyramid, and the signal receiving point is a vertex of the second pyramid; and determining that space in which the first pyramid is located and space in which the second pyramid is located are space in which a beam after scattering is located.

In one embodiment, the tracking each initial beam to determine a propagation manner of each initial beam in the three-dimensional object includes: traversing each initial beam and searching for a leaf node that intersects with each initial beam; and determining a location relationship between each initial beam and a closest facet to determine the propagation manner of each initial beam in the three-dimensional object, where the closest facet is a first facet that intersects with each initial beam in space of the leaf node.

In one embodiment, the location relationship includes that the beam does not intersect with the facet, the beam partially intersects with the facet, and the beam completely intersects with the facet.

In one embodiment, when the location relationship is that the initial beam does not intersect with the facet, after the determining a location relationship between each initial beam and a closest facet, the method further includes: determining a location relationship between the initial beam and another facet in the space of the leaf node.

In one embodiment, when the location relationship is that the initial beam partially intersects with the facet, after the determining a location relationship between each initial beam and a closest facet, the method further includes: splitting the initial beam to obtain a non-intersected beam and a first reflected beam generated by an intersected beam; putting the non-intersected beam and the first reflected beam into a queue, where the queue is used to store all to-be-processed beams; determining whether the initial beam collides with an edge of the facet; and determining to generate a new diffracted beam if the initial beam collides with the edge of the facet.

In one embodiment, in an eleventh implementation of the first aspect of the embodiments of the invention, when the location relationship is that the initial beam completely intersects with the facet, after the determining a location relationship between each initial beam and a closest facet, the method further includes: putting a second reflected beam that is generated by the intersection of the initial beam and the facet into a queue, where the queue is used to store all to-be-processed beams; determining whether the initial beam collides with an edge of the facet; and determining to generate a new diffracted beam if the initial beam collides with the edge of the facet.

A second aspect of the invention provides a search apparatus, including: a modeling unit, configured to define a target three-dimensional object, where the target three-dimensional object is configured to describe full space; and the modeling unit is further configured to set a signal transmission point in internal space of the target three-dimensional object to perform initial beam modeling of a signal point source, where the signal transmission point is used to transmit an initial beam; a tracking unit, configured to track each initial beam to determine a propagation manner of each initial beam in the target three-dimensional object; and a determining unit, configured to determine that a path corresponding to a target beam is an effective path when the target beam reaches a signal receiving point, where the target beam is included in each initial beam, or is obtained after the initial beam is split or changed.

In one embodiment, the propagation manner includes collineation, reflection, diffraction, transmission, or scattering.

In one embodiment, the modeling unit is further configured to perform modeling based on the propagation manner.

In one embodiment, when the propagation manner is diffraction, the modeling unit is specifically configured to obtain a diffraction face that uses a diffraction edge as a normal line and that passes the signal transmission point; use a circle that is centered at an intersection of the diffraction edge and the diffraction face and that passes the signal transmission point as a diffraction circle;

transmit a ray from the signal transmission point through two ends of the diffraction edge to obtain a beam face, where the beam face is located on the other side of the signal transmission point relative to the diffraction edge; move the signal transmission point on the diffraction circle to obtain infinite corresponding beam faces; and use space formed by the infinite beam faces as space in which a new beam generated after diffraction is located, where the new beam generated after diffraction includes at least one beam.

In one embodiment, when the propagation manner is reflection, the modeling unit is specifically configured to determine a shielding face, where the shielding face is used to reflect a beam transmitted from the signal transmission point; determine space formed by the beam before reflection as beam space, where a contact face between the beam space and the shielding face is an end face of the beam space, and a portion of beam' space on the same side as effective beam space is effective beam' space; perform space mirroring on the beam space based on the shielding face to obtain the beam' space, where a contact face between the beam' space and the shielding face is a start face of the beam' space, and the portion of the beam' space on the same side as the effective beam space is the effective beam' space; and reflect the beam transmitted by the signal transmission point on the shielding face to obtain reflection space, where the reflection space includes the effective beam space and the effective beam' space.

In one embodiment, when the propagation manner is transmission, the modeling unit is specifically configured to extend a transmitted beam and intersect the transmitted beam with a first face of a building, where the transmitted beam is a beam of the end face on a second face of the building, the first face and the second face are faces of the building, and the first face and the second face are different faces.

In one embodiment, when the propagation manner is scattering, the modeling unit is specifically configured to use the initial beam of the signal point source to separately perform modeling on the signal transmission point and the signal receiving point to obtain a scattering face, where the scattering face is an intersection set of a signal transmission point model and a signal receiving point model in a visible area of a shielding face; construct, based on the signal transmission point and the signal receiving point, a first pyramid and a second pyramid by using the scattering face as a bottom face, where the signal transmission point is a vertex of the first pyramid, and the signal receiving point is a vertex of the second pyramid; and determine that space in which the first pyramid is located and space in which the second pyramid is located are space in which a beam after scattering is located.

In one embodiment, the tracking unit includes a searching module, configured to traverse each initial beam and search for a leaf node that intersects with each initial beam; and a judging module, configured to determine a location relationship between each initial beam and a closest facet to determine the propagation manner of each initial beam in the three-dimensional object, where the closest facet is a first facet that intersects with each initial beam in space of the leaf node.

In one embodiment, in an eighth implementation of the second aspect of the embodiments of the invention, the location relationship includes that the beam does not intersect with the facet, the beam partially intersects with the facet, and the beam completely intersects with the facet.

In one embodiment, when the location relationship is that the initial beam does not intersect with the facet, the search apparatus further includes a judging unit, configured to determine a location relationship between the initial beam and another facet in the space of the leaf node.

In one embodiment, when the location relationship is that the initial beam partially intersects with the facet, the search apparatus further includes: a judging unit, where the judging unit is specifically configured to split the initial beam to obtain a non-intersected beam and a first reflected beam generated by an intersected beam; put the non-intersected beam and the first reflected beam into a queue, where the queue is used to store all to-be-processed beams; judge whether the initial beam collides with an edge of the facet; and determine to generate a new diffracted beam if the initial beam collides with the edge of the facet.

In one embodiment, when the location relationship is that the initial beam completely intersects with the facet, the search apparatus further includes: a judging unit, where the judging unit is specifically configured to put a second reflected beam that is generated by the intersection of the initial beam and the facet into a queue, where the queue is used to store all to-be-processed beams; determine whether the initial beam collides with an edge of the facet; and determine to generate a new diffracted beam if the initial beam collides with the edge of the facet.

A third aspect of the invention provides a computer-readable storage medium. The computer-readable storage medium stores an instruction, and when the instruction is run on a computer, the computer is enabled to perform the methods according to the foregoing aspects.

A fourth aspect of the invention provides a computer program product including an instruction, and when the computer program product is run on a computer, the computer is enabled to perform the methods according to the foregoing aspects.

From the technical solution described above, the embodiments of the present invention have the following advantages, including: defining a target three-dimensional object, where the target three-dimensional object is configured to describe full space; setting a signal transmission point in internal space of the target three-dimensional object to perform initial beam modeling of a signal point source, where the signal transmission point is used to transmit an initial beam; tracking each initial beam to determine a propagation manner of each initial beam in the three-dimensional object; and determining that a path corresponding to a target beam is an effective path when the target beam reaches a signal receiving point. In this embodiment of the invention, a full space path search capability is constructed by beaming. Because there is spatial correlation between adjacent rays, computing efficiency can be greatly improved by turning the ray into a beam, that is, a beam. Moreover, all rays in the full space may be described by beaming, and more propagation path may be found, ensuring that the path loss does not occur when the distance increases with the computation efficiency.

DESCRIPTION OF EMBODIMENTS

Embodiments of the present invention provide a propagation path search method and a path search apparatus, used for solving a problem in the prior art of path loss due to increased distance, and improving accuracy of a propagation model.

The following clearly and completely describes the technical solutions in the embodiments of the invention with reference to the accompanying drawings in the embodiments of the invention. Apparently, the described embodiments are merely some but not all of the embodiments of the invention. All other embodiments obtained by a person skilled in the art based on the embodiments of the invention without creative efforts shall fall within the protection scope of the invention.

Ray-tracing is usually used to perform propagation prediction of radio signals. Accuracy of ray-tracing determines accuracy of the prediction result. The basic concept is that a location of a transmission source is first determined, and all propagation paths of rays at the receiving location are found out based on the feature and distribution of a building on a map, and then reflection and diffraction losses are determined. Currently, a ray tracing model based on geometric optics and consistent diffraction theory is generally used to research the impact of geographic and terrain details on radio wave propagation, thereby a prediction model for accurately researching path loss features and field strength distribution of electromagnetic waves is carried out.

Figure 1:
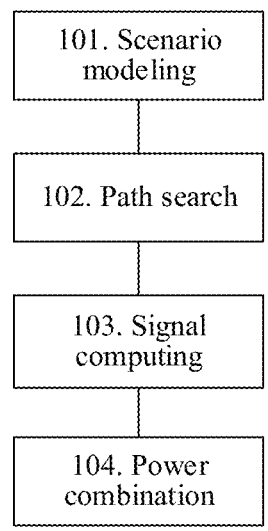
FIG. 1 is a schematic flowchart of a ray tracking model in the prior art.

In an actual application, a ray tracing model may usually include four operations shown in FIG. 1. 101. Scenario modeling. 102. Path search. 103. Signal computing. 104. Power combination.

Operation 101. Scenario Modeling.

Figure 2:
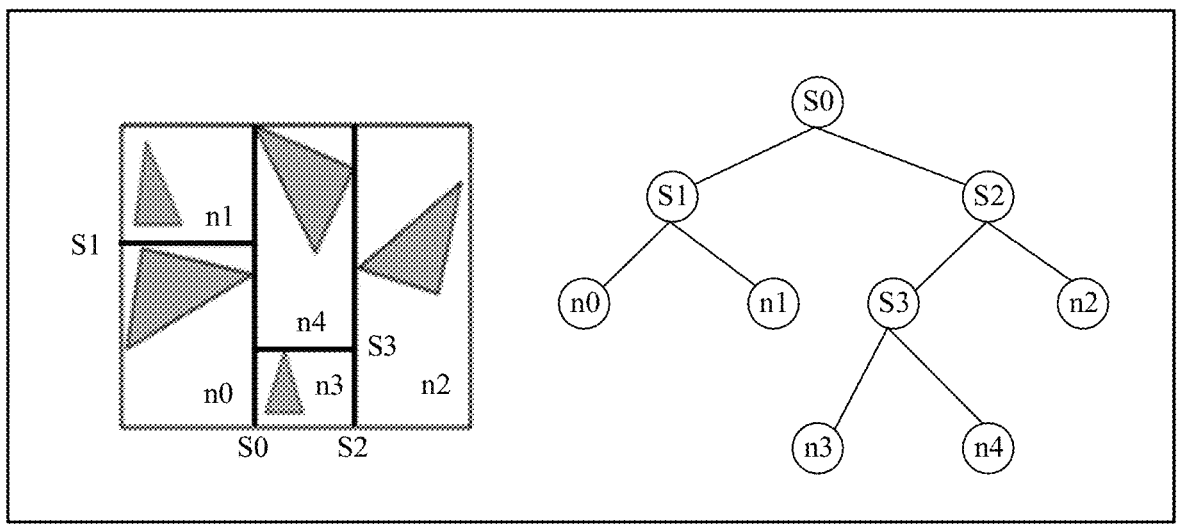
FIG. 2 is a model diagram of a binary-tree in the prior art.
Figure 3:
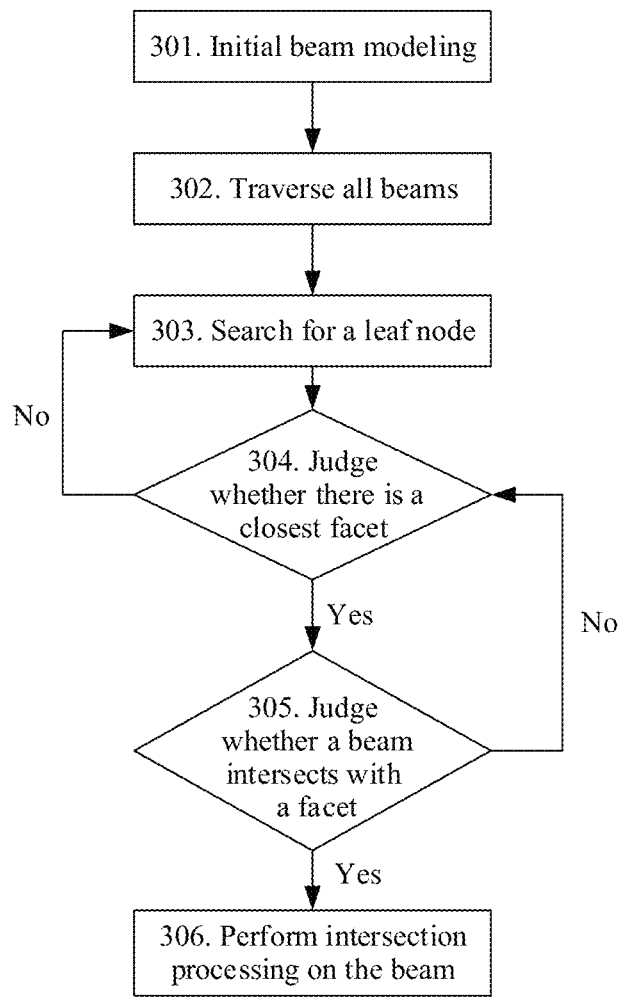
FIG. 3 is a flowchart of a propagation path search method according to an embodiment of the invention [TC1]

The scenario modeling is to establish a database of an environmental building in a cell. In the database, the building in the cell is simplified to a combination of facets, and information of a face, a wedge, and a vertex is extracted for computing. Therefore, radio wave propagation in the cell is simplified to some combinations of collineation, reflection and diffraction. A propagation path may be obtained by using the ray tracing technology. Because there is a large quantity of buildings in actual environment, direct ray tracing consumes a lot of times, so some acceleration technologies are needed. Mirroring, pincushion, and space volumetric portioning (SVP) are such acceleration technologies. The SVP technology can effectively reduce a quantity of inspections on whether rays are blocked, greatly improving efficiency of ray tracing. Therefore, the scenario modeling may include the following two operations. (1) Data preparation of a building. (2) Space splitting and treeing. Data preparation of building is to convert building information to facet (face) or edge required for beam or ray reflection. It can be understood that the facet in this application is used to represent a finite face, and describe a face of a building or another obstruction. The edge is used to represent a finite straight line, and describe a division between facets of the building or another obstruction. An objective of space splitting and treeing is to increase the cost of an intersection test performed on the beam, the facet and edge. For ease of understanding, as shown in FIG. 2, a binary tree on the right side of the figure is generated by space splitting and treeing two-dimensional space on the left side of the figure. Each child node is subspace of a parent node. In an actual application, a quadtree or others may also be generated. This is not limited herein.

After completing scenario modeling, path search of operation 102 is performed. In the process of path search, this embodiment of the invention provides a propagation path search method, used for improving the accuracy of the propagation model. The method specifically includes:

301. Initial Beam Modeling.

It should be noted that the definition of ray in this application is similar to a definition of ray in the prior art. In other words, the definition describes a transmission path of a signal in a specific space direction. The signal's propagation path from a signal transmitter to a signal receiver in full space or subspace may be multi-segment, which can be described by multi-segment rays in the space. Likewise, the beam in this application describes a set of a series of rays, and the signal's propagation path in specific subspace.

Initial beam modeling is performed based on a location of the signal transmitter. Methods of initial beam modeling include the following.

1. Initial Beam Modeling of a Signal Point Source

Figure 4:
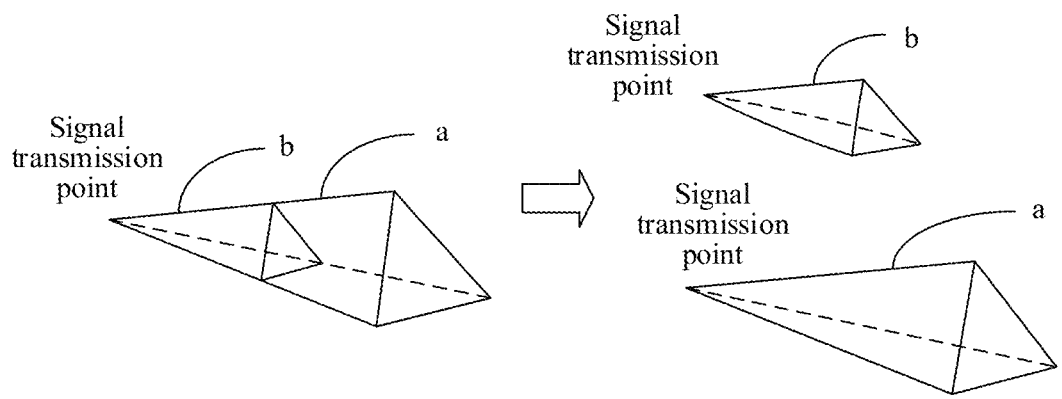
FIG. 4 is a schematic modeling diagram according to an embodiment of the invention.

Because a beam is infinite, to describe the beam by using a value, a finite pyramid may be defined in this application to describe an infinite beam. The finite pyramid is obtained by scaling while an infinite beam signal point source (that is, the vertex of the pyramid) remains unchanged. In this case, a side of the finite pyramid and the infinite beam are coplanar. For ease of understanding, as shown in FIG. 4, a pyramid a and a pyramid b have a same vertex. The pyramid b can be considered to be obtained by scaling based on the pyramid a. Therefore, the finite pyramid b can be used to describe the infinite pyramid a.

In addition, in the process of determining whether the point is inside the beam, it is only necessary to determine that the point is in all sides of the pyramid, and it is not necessary to determine a bottom face. Such a finite pyramid represents infinite space.

Figure 5:
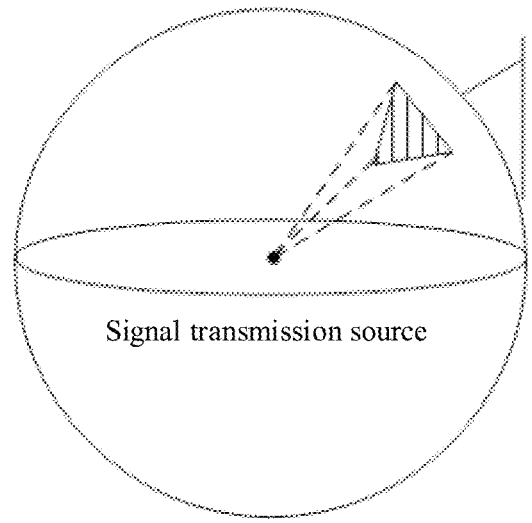
FIG. 5 is another schematic modeling diagram according to an embodiment of the invention.

Similarly, it is considered that for the initial beam modeling of the signal point source, the signal transmission point falls within a three-dimensional object (excluding a face of the three-dimensional object) by defining the three-dimensional object. Therefore, a beam set covering the full space is obtained by space splitting. It should be noted that the three-dimensional object may be a polyhedron or a sphere. This is not specifically limited in this application. FIG. 5 is a schematic diagram of an initial beam modeling according to an embodiment of the invention. A triangular pyramid forms transmission source sphere space to form the initial beam.

In one embodiment, because efficiency of operations between the beams may be further improved by parallelization or multithreading, vertex angles of the beams may be equal, so that a collision probability of the mathematical expectation between each beam and an object in space may be equal. Therefore, in this embodiment of the invention, the initial beam modeling method may be: (1) space splitting is performed on a platonic polyhedra, where the platonic polyhedra includes a regular tetrahedron, a regular hexahedron, a regular octahedron, a regular dodecahedron, and a regular icosahedron; and (2) the signal transmission point is located at a centroid of the platonic polyhedra.

It can be known from the foregoing that the initial beam modeling of the signal point source obtains a set of all rays from the signal transmission point in ideal full space, where the ideal full space is space that has no obstructions and that is infinite. In other words, for the initial beam modeling, it is necessary to ensure a full set of initial beams and the ideal full space to ensure that beams are seamless.

It should be noted that, because an actual application scenario is usually not the ideal full space and the beam may encounter obstacles, the beam continuously changes the propagation path through collineation, transmission, reflection, diffraction and scattering. Therefore, the initial beam modeling requires to split the space into infinite or finite beams (pyramids). Therefore, the following separately describes diffracted beam modeling, reflected beam modeling, transmission beam modeling, and scattered beam modeling.

A. Diffraction Beam Modeling

To define the diffracted beam modeling method, a shape of a diffracted beam needs to be first defined in the idea full space.

Figure 6A:
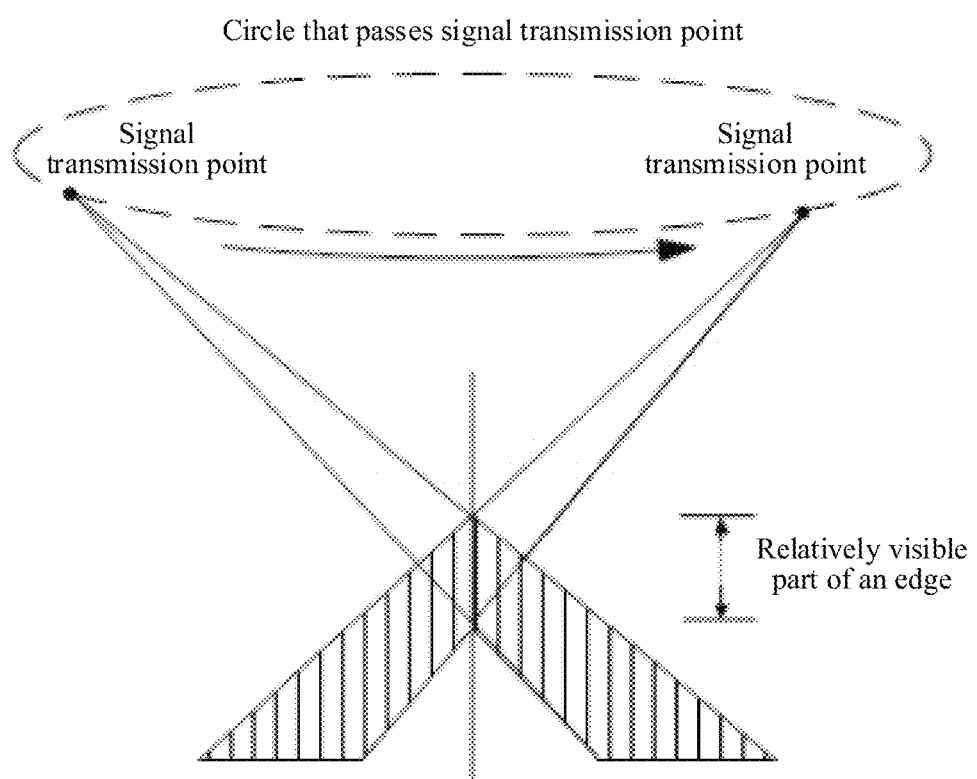
FIG. 6A is another schematic modeling diagram according to an embodiment of the invention.
Figure 6B:
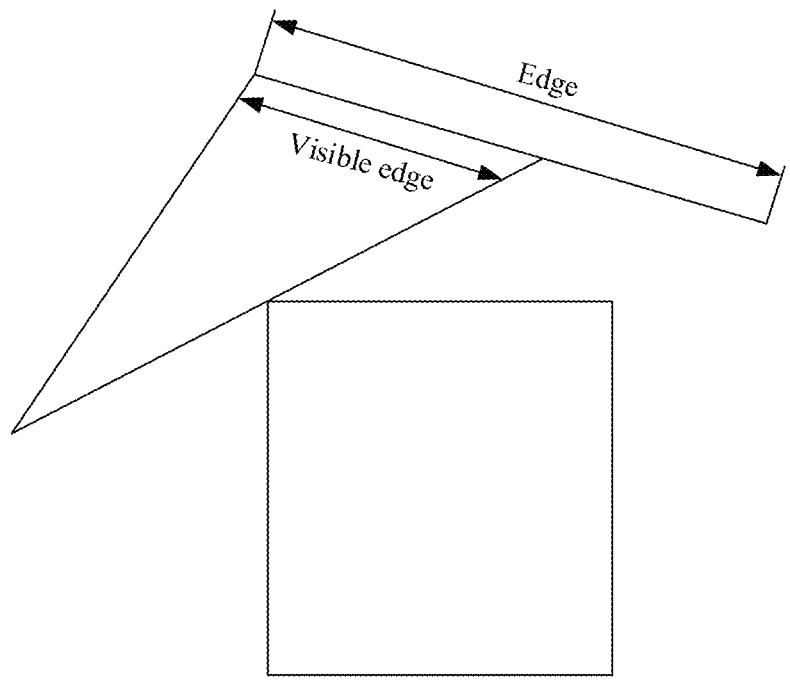
FIG. 6B is another schematic modeling diagram according to an embodiment of the invention.

When the beam encounters an edge, diffraction may happen. It should be noted that in an actual application, there may be a case in which a part of the edge is blocked. If only the diffraction is considered, only unblocked part of the entire edge participates in diffraction. As shown in FIG. 6A, it can be seen that only a visible edge participates in diffraction. In this application, for ease of description, the part of the edge that can participate in diffraction is referred to as a diffraction edge. FIG. 6B is a schematic diagram of a diffracted beam modeling according to an embodiment of the invention, including: (1) making a face that uses a diffraction edge as a normal line and that passes a signal transmission point (Origin); and denoting a circle that is centered at an intersection of the normal line and the face and that passes the Origin as Origin Circle; (2) transmitting a signal through two ends of the diffraction edge from the Origin to obtain that the beam face is located on the other side of the Origin relative to the diffraction edge; and moving the Origin on the Origin Circle to obtain infinite Origin's, and infinite corresponding face beams may similarly be obtained. Space formed by infinite face beams may be space in which the diffracted beam is located.

In addition, compared with the initial beam of the signal point source, a difference of the diffracted beam is that:

(1) Reverse extension lines of the diffracted beam may not converge to one point, so that the diffracted beam has a plurality of source points.

Figure 7:
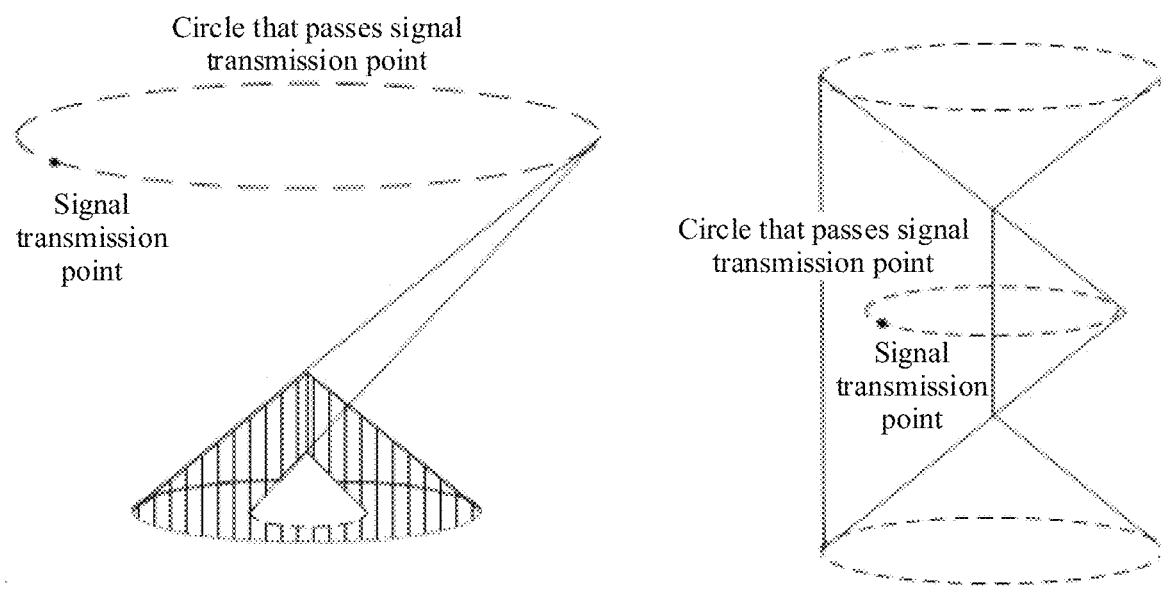
FIG. 7 is another schematic modeling diagram according to an embodiment of the invention.

(2) A diffracted beam cannot cover the full space, and the diffracted beam has two kinds of shapes based on a signal source point and a relative location of the diffraction edge, as shown in FIG. 7.

In summary, for the initial beam modeling of the signal point source, only a three-dimensional object needs to be defined so that the diffraction edge falls within the three-dimensional object (excluding a face of the three-dimensional object), and the part that the diffracted beam cannot reach is excluded. In other words, a beam set covering the full space can be obtained through space splitting. It should be noted that the three-dimensional object may be a polyhedron or a cylinder. This is not limited herein.

Figure 8:
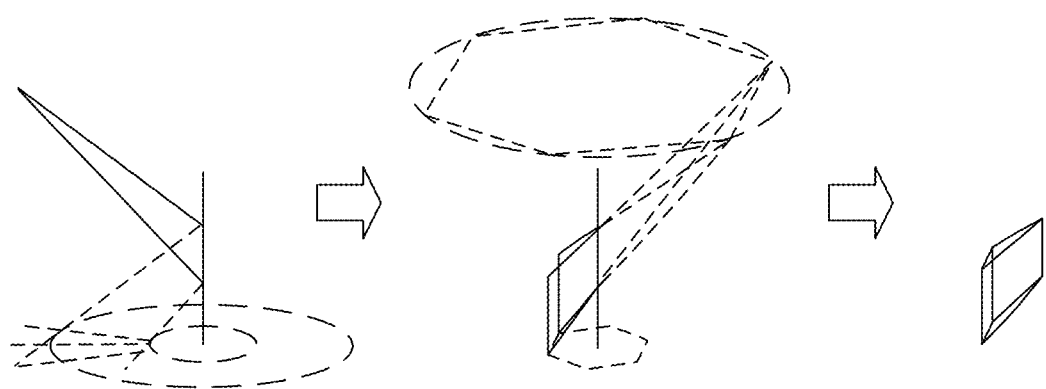
FIG. 8 is another schematic modeling diagram according to an embodiment of the invention.

In one embodiment, because efficiency of operations between the beams may be further improved by parallelization or multithreading, vertex angles of the beams may be equal, so that a collision probability of the mathematical expectation between each beam and an object in space may be equal. FIG. 8 is a schematic diagram of an initial beam modeling according to an embodiment of the invention. The initial beam modeling method may include: (1) generating a regular N polygon, such as a square, a regular hexagon, a regular octagon, a regular dodecagon, or a regular golygon, based on an origin circle; 2) generating a sufficiently long regular N prism with the diffraction edge as an axis; 3) rotating the regular N prism so that a connection line between the regular N polygon and the vertex of the diffraction edge passes a side edge of the prism.

B. Completely Reflected Beam Modeling

Figure 9:
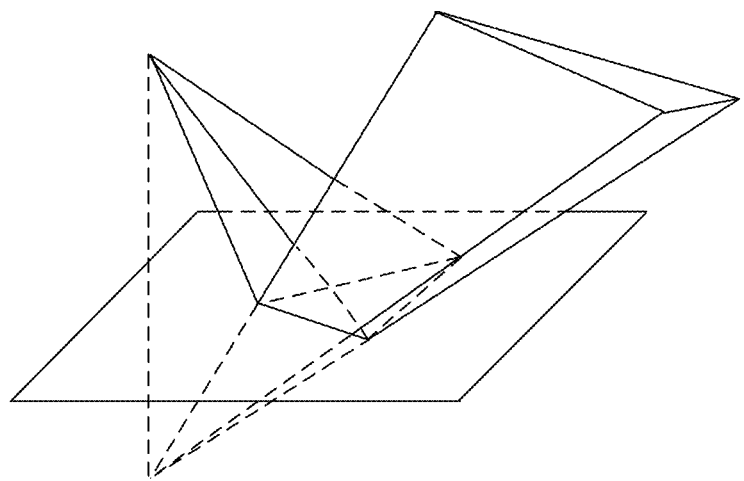
FIG. 9 is another schematic modeling diagram according to an embodiment of the invention.
Figure 10:
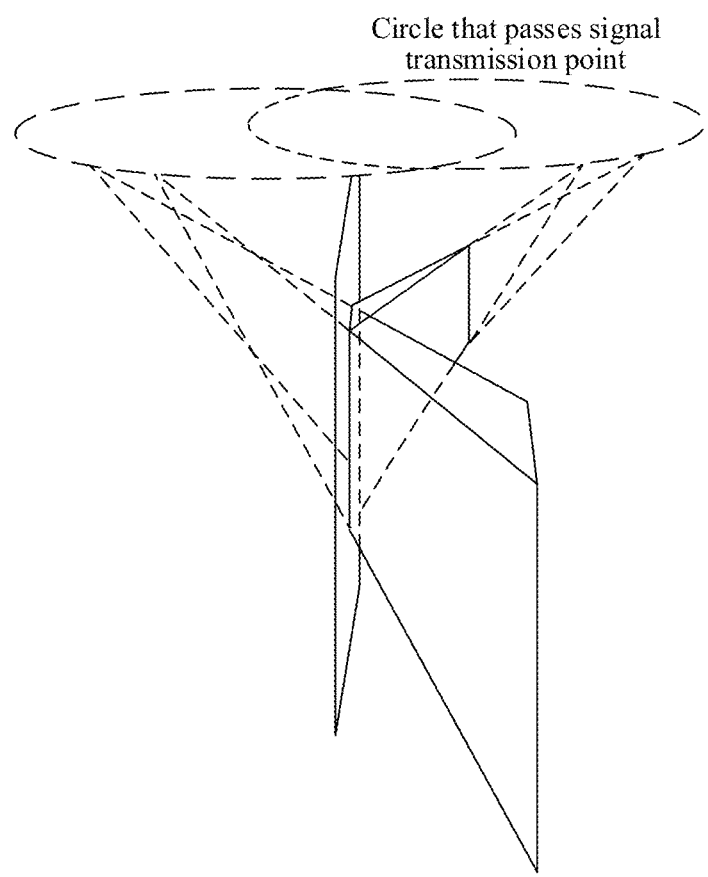
FIG. 10 is another schematic modeling diagram according to an embodiment of the invention.

Complete reflection means that an entire beam may be reflected on a shielding face to obtain a beam'. To define a modeling method of a complete reflected beam, concepts of a start face and an end face need to be added on the basis of initial beam modeling and diffracted beam modeling for the signal point source. It may be understood that space represented by a beam is further limited between the Start face and the End face. It should be noted that the Start face and the End face in this application may not be parallel, or may be parallel. This is not limited in this application. A specific modeling manner may include the following operations, as shown in FIG. 9 and FIG. 10: (1) Update an End face of a beam to a shielding face. (2) Perform space mirroring on the beam based on the shielding face to obtain a beam' (effective parts of the beam and the beam' are on a same side of the shielding face), and update a Start face of the beam to the shielding face. It should be noted that, the signal source point of the beam is also obtained by performing space mirroring base on the shielding face, to obtain the signal source point of the beam'.

In addition, in a scenario of one reflection, the beam and the beam' can only completely describe one complete reflection process of the beam. The method may be applied for a plurality of times based on an actual requirement, to adapt to a scenario in which a propagation path needs to be reflected for a plurality of times in the actual application.

C. Transmission Beam Modeling

In this application, transmission is performed on a building. It is assumed that signal transmission does not change a ray path, and cannot penetrate an external wall of the building twice. Therefore, a beam of the End face on a face of the building may be used, and the beam is extended and intersects with another face of the building to obtain a result.

It should be noted that in the actual application, in most scenarios, a user does not know a wall structure in a building. Therefore, this application provides a simple equivalent signal modeling manner. However, in a special scenario, facet and edge modeling may also be performed on information about walls inside the building in this application, so that the beam is reflected and/or diffracted inside the building. For example, for vegetation transmission, after a path from the signal transmission point to the signal receiving point is generated, each path is superimposed.

D. Scattered Beam Modeling

Figure 11:
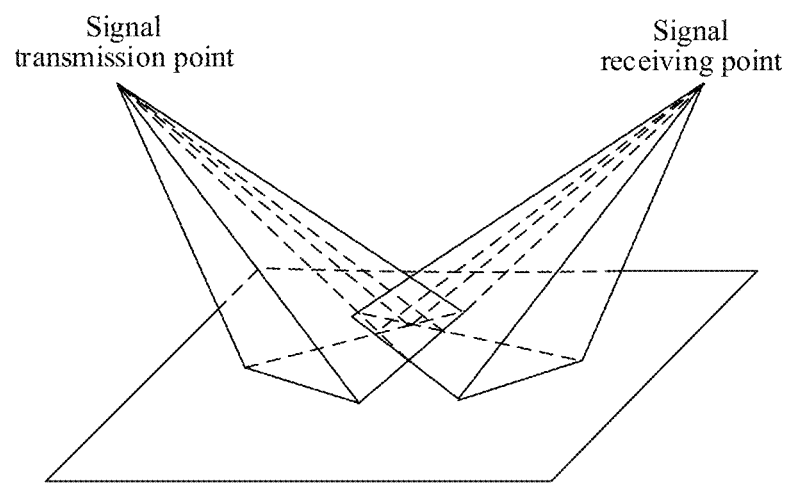
FIG. 11 is another schematic modeling diagram according to an embodiment of the invention.

Because scattered rays obtained by scattering are all in the full space, in this application, the scattered beam modeling may include the following operations: performing initial beam modeling of the signal point source at the signal transmission point to obtain the signal transmission point model and performing initial beam modeling of the signal point source at the signal receiving point to obtain the signal receiving point model (optional diffracted beam modeling or reflected beam modeling may be added), so as to obtain an intersection set of visible areas of two models on a shielding face, where the intersection set may be referred to as a scattering face in this application; using the scattering surface as a bottom face and the signal transmission point as a vertex to obtain a first pyramid, and using the scattering surface as a bottom face and the signal receiving point as a vertex to obtain a second pyramid, where the space in which the first pyramid is located and the space in which the second pyramid is located are space in which a beam after scattering is located. In other words, all paths of scattering are obtained. FIG. 11 shows a scattered beam modeling manner according to an embodiment of the invention. A path of the scattered beam starts from a signal transmission point, passes a shielding face, and ends at a signal receiving point.

In one embodiment, in the actual application, because there may be a large quantity of full space scattering paths, some paths with relatively strong signals may be selected for computing, to further reduce a computing amount. This is not specifically limited in this application.

In addition, in the actual application, modeling for a complex scenario is further included. Therefore, the foregoing model can support the following complex scenario: a signal point source+(diffraction/reflection/scattering)*n+ transmission. "+" is used to indicate a sequence of various modeling operations, and "*" is used to indicate n operations. It may be understood that quantities of times for which diffraction, reflection, or scattering is separately invoked may be the same or different from each other. This is not specifically limited herein.

It should be noted that the scattered beam modeling can be invoked only once, and a location is not limited. Except that the initial beam modeling of the signal point source is mandatory, a quantity of times of invoking other modeling may be user-defined. For example, only two reflection and one diffraction are considered, and scattering is not considered.

302. Traverse All Beams.

After the initial beam modeling is completed, an operation of traversing all beams is performed. In this operation process, a queue needs to be maintained to store all to-be-processed beams. Because a beam is reflected or diffracted when the beam touches a face or an edge in space, a new beam is generated or an original beam is split. Therefore, the obtained new beam may be put in the queue. After all current beams in the queue are processed, a next round of processing is performed. An operation of traversing all beams ends until some service constraint conditions are met, for example, reflection can be performed only twice, or all beams are processed.

303. Search for a Leaf Node.

Similar to the foregoing space splitting and treeing objectives, an objective of leaf node search is also to increase a cost of performing an intersection test on a beam, a facet, and an edge. It should be noted that, this operation also needs to be used in the ray-based method of searching for a full space signal propagation path. However, in the ray-based scenario and the beam-based scenario, processing solutions are slightly different. As shown in FIG. 2, a binary tree is generated from two-dimensional space on a left side by space splitting and treeing. In a subsequent process of determining intersection between the beam and the space, from a specified node, a close node of the tree is first searched for, and then a far node of the tree is searched for. It should be noted that, in different algorithms, specified nodes are also different. For example, in a StackKd-Tree algorithm, the specified node is a root node; in a RopeKd-Tree algorithm, the specified node may be any node. This is not specifically limited herein. If the beam intersects a space bounding box of a node in the tree, whether the beam intersects a subnode of the node is continuously checked; and if the beam does not intersect with a node in the tree, whether the beam intersects with a brother node of the node or a brother node of a parent node is continuously checked, until a leaf node of the tree is found or all nodes on the tree are traversed. It may be understood that, in FIG. 2, a parent node of n0 is S1, and a brother node of n0 is n1.

304. Determine whether there is a closest facet. If there is a closest facet, operation 305 is performed; if there is no closest facet, operation 303 is performed.

After the leaf node search process is performed, whether there is a closest facet is determined, to find a first facet that may intersect with a beam in leaf node space. In this application, a distance between each facet and a beam light source point may be determined, and a facet corresponding to a minimum distance is selected as the closet facet. If the facet exists, operation 305 is performed. If the facet plate does not exist, operation 303 is performed.

305. Determine whether the beam intersects with the facet. If the beam intersects with the facet, operation 306 is performed; if the beam does not intersect with the facet, operation 304 is performed.

If there is the closet facet, a location relationship between the beam and the facet is determined. The location relationship may include the following types: (1) The beam does not intersect with the facet. (2) The beam partially intersects with a facet. (3) The beam completely intersects with the facet. It should be noted that if the location relationship between the beam and the facet is that the beam does not intersect with the facet, operation 304 is performed, and an intersection relationship between the beam and another facet in the leaf node space continues to be determined. If the location relationship between the beam and the facet is that the beam partially or completely intersects with the facet, operation 306 is performed.

It may be understood that, by using a cyclic invocation process in operation 304 and operation 305, a non-intersected facet that has been computed in the leaf node space may be excluded, thereby improving computing efficiency.

306. Perform Intersection Processing on Beams.

When the beam intersects with the facet, the following two cases are included.

(1) The beam partially intersects with the facet. The beam is first split, and then a non-intersected part and a reflected beam generated by an intersected part of the beam is put into the queue in operation 302. Then, whether the beam touches a facet edge is checked to determine whether a new diffracted beam is generated. If the beam touches the facet edge, it is determined that a new diffracted beam is generated. If the beam does not touch the facet edge, it is determined that no new diffracted beam is generated.

(2) The beam completely intersects with the facet. The reflected beam generated by the original beam is first put in the queue in operation 302. Then, whether the beam touches the facet edge is checked to determine whether a new diffracted beam is generated.

It may be understood that, a new beam generated in this process or a new beam obtained by splitting the original beam is put in the queue in operation 302, and waits for next-round of processing until some service constraint conditions are met or all beams are processed. In other words, operation 102 in FIG. 1, that is, path search, is ended.

It should be noted that, if the signal receiving point side receives the beam (for ease of description, a beam that reaches the signal receiving point is referred to as a target beam in this application), a signal propagation path corresponding to the target beam is determined as an effective path. Further, signal computing in operation 103 and energy combination in operation 104 in FIG. 1 are performed on the effective path. Because both signal computing and energy combination are in the prior art. Details are not described in this application.

In this embodiment of the invention, a full space path search capability is constructed by beaming. Because there is spatial correlation between adjacent rays, computing efficiency can be greatly improved by turning the rays into beams. Moreover, all rays in the full space may be described by beaming, and more propagation path may be found, ensuring that the path loss does not occur when the distance increases while the computation efficiency meets a requirement. Therefore, compared with the prior art, the full space path search is implemented, instead of a path search in which space is sampled. Compared with a dense ray sampling method, the performance of the full space path search is greatly improved.

Figure 12:
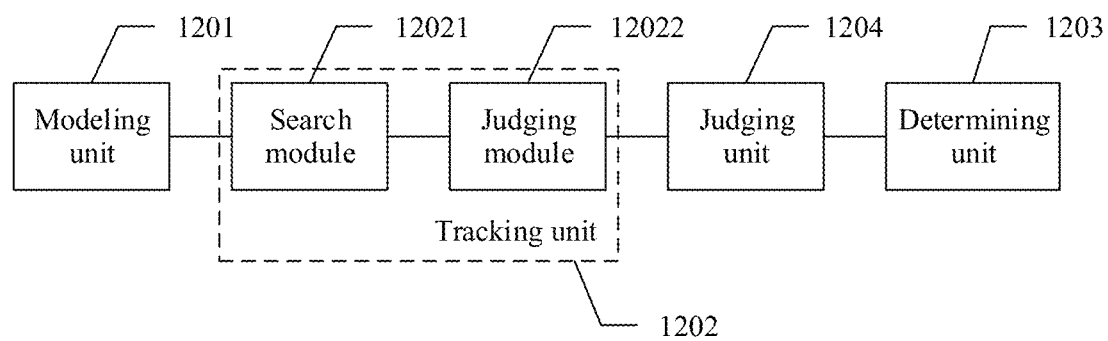
FIG. 12 is a schematic structural diagram of a search apparatus according to an embodiment of the invention.

The propagation path search method in the embodiments of the invention is described above, and the following describes the search apparatus in the embodiments of the invention. Referring to FIG. 12, an embodiment of the search apparatus in the embodiments of the invention includes:

a modeling unit 1201, configured to define a target three-dimensional object, where the target three-dimensional object is configured to describe full space; and the modeling unit 1201 is further configured to set a signal transmission point in internal space of the target three-dimensional object to perform initial beam modeling of a signal point source, where the signal transmission point is used to transmit an initial beam;

a tracking unit 1202, configured to track each initial beam to determine a propagation manner of each initial beam in the target three-dimensional object; and a determining unit 1203, configured to determine that a path corresponding to a target beam is an effective path when the target beam reaches a signal receiving point, where the target beam is included in each initial beam, or is obtained after the initial beam is split or changed.

In a feasible implementation, the modeling unit 1201 is further configured to perform modeling based on the propagation manner.

In a feasible implementation, when the propagation manner is diffraction, the modeling unit 1201 is specifically configured to obtain a diffraction face that uses a diffraction edge as a normal line and that passes the signal transmission point; use a circle that is centered at an intersection of the diffraction edge and the diffraction face and that passes the signal transmission point as a diffraction circle; transmit a ray from the signal transmission point through two ends of the diffraction edge to obtain a beam face, where the beam face is located on the other side of the signal transmission point relative to the diffraction edge; move the signal transmission point on the diffraction circle to obtain infinite corresponding beam faces; and use space formed by the infinite beam faces as space in which a new beam generated after diffraction is located, where the new beam generated after diffraction includes at least one beam.

In a feasible implementation, when the propagation manner is reflection, the modeling unit 1201 is specifically configured to determine a shielding face, where the shielding face is used to reflect a beam transmitted from the signal transmission point; determine space formed by the beam before reflection as beam space, where a contact face between the beam space and the shielding face is an end face of the beam space, and a portion of beam' space on the same side as effective beam space is effective beam' space; perform space mirroring on the beam space based on the shielding face to obtain the beam' space, where a contact face between the beam' space and the shielding face is a start face of the beam' space, and the portion of the beam' space on the same side as the effective beam space is the effective beam' space; and reflect the beam transmitted by the signal transmission point on the shielding face to obtain reflection space, where the reflection space includes the effective beam space and the effective beam' space.

In a feasible implementation, when the propagation manner is transmission, the modeling unit 1201 is specifically configured to extend a transmitted beam and intersect the transmitted beam with a first face of a building, where the transmitted beam is a beam of the end face on a second face of the building, the first face and the second face are faces of the building, and the first face and the second face are different faces.

In a feasible implementation, when the propagation manner is scattering, the modeling unit 1201 is specifically configured to use the initial beam of the signal point source to separately perform modeling on the signal transmission point and the signal receiving point to obtain a scattering face, where the scattering face is an intersection set of a signal transmission point model and a signal receiving point model in a visible area of a shielding face; construct, based on the signal transmission point and the signal receiving point, a first pyramid and a second pyramid by using the scattering face as a bottom face, where the signal transmission point is a vertex of the first pyramid, and the signal receiving point is a vertex of the second pyramid; and determine that space in which the first pyramid is located and space in which the second pyramid is located are space in which a beam after scattering is located.

In a feasible implementation, the tracking unit 1202 includes:

a searching module 12021, configured to traverse each initial beam and search for a leaf node that intersects with each initial beam; and a judging module 12022, configured to determine a location relationship between each initial beam and a closest facet to determine the propagation manner of each initial beam in the three-dimensional object, where the closest facet is a first facet that intersects with each initial beam in space of the leaf node.

In a feasible implementation, when the location relationship is that the initial beam does not intersect with the facet, the search apparatus further includes:

a judging unit 1204, configured to determine a location relationship between the initial beam and another facet in the space of the leaf node.

In a feasible implementation, when the location relationship is that the initial beam partially intersects with the facet, the judging unit 1204 is further configured to:

split the initial beam to obtain a non-intersected beam and a first reflected beam generated by an intersected beam; put the non-intersected beam and the first reflected beam into a queue, where the queue is used to store all to-be-processed beams; determine whether the initial beam collides with an edge of the facet; and determine to generate a new diffracted beam if the initial beam collides with the edge of the facet.

In a feasible implementation, when the location relationship is that the initial beam completely intersects with the facet, the judging unit 1204 is further configured to:

put a second reflected beam that is generated by the intersection of the initial beam and the facet into a queue, where the queue is used to store all to-be-processed beams; determine whether the initial beam collides with an edge of the facet; and determine to generate a new diffracted beam if the initial beam collides with the edge of the facet.

Figure 13:
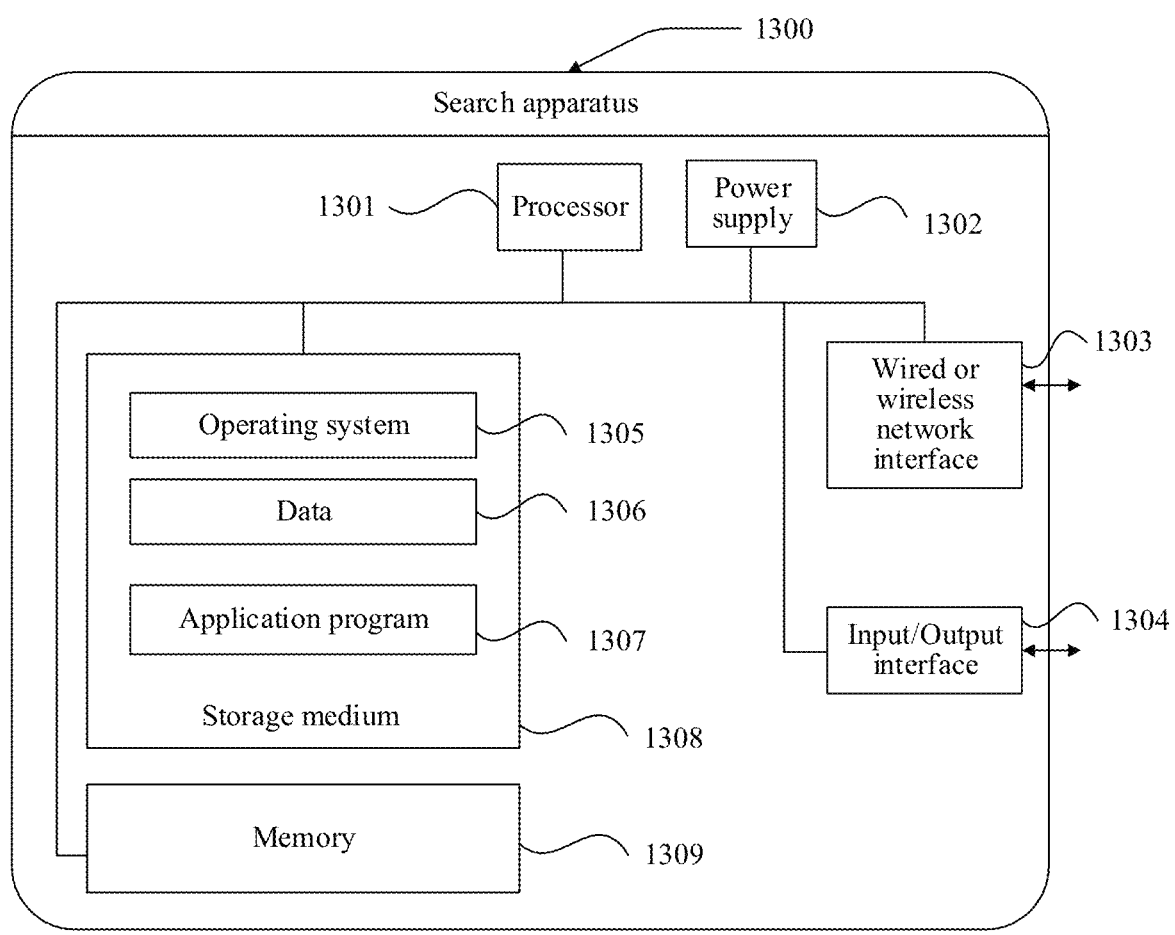
FIG. 13 is a schematic structural diagram of another search apparatus according to an embodiment of the invention.

The search apparatus in the embodiments of the invention is described in detail from a perspective of a modular functional entity in FIG. 12, and the following describes the search apparatus in the embodiments of the invention in detail from a perspective of hardware processing. Referring to FIG. 13, another embodiment of a search apparatus according to an embodiment of the invention includes the following.

FIG. 13 is a schematic structural diagram of a search apparatus according to an embodiment of the invention. The search apparatus 1300 may be greatly different due to different configuration or performance, and may include one or more central processing units (CPU) 1301 (for example, one or more processors), a memory 1309, or one or more storage mediums 1308 (for example, one or more mass storage devices) that store an application program 1307 or data 1306. The memory 1309 and the storage mediums 1308 may be used for transient storage or persistent storage. The program stored in the storage mediums 1308 may include one or more modules (not shown in the figure), and each module may include a series of instruction operations in a search apparatus. Further, the processor 1301 may be configured to communicate with the storage mediums 1308, and perform, in the search apparatus 1300, a series of instruction operations in the storage mediums 1308.

The search apparatus 1300 may further include one or more power supplies 1302, one or more wired or wireless network interfaces 1303, one or more input/output interfaces 1304, and/or, one or more operating systems 1305, for example, Windows Server, Mac OS X, UNIX, Linux, Free-BSD. A person skilled in the art may understand that the structure of the search apparatus shown in FIG. 13 does not constitute a limitation to the search apparatus, and the search apparatus may include more or fewer components than those shown in the figure, or some components may be combined, or a different component deployment may be used.

Composition components of the search apparatus are specifically described in the following with reference to FIG. 13.

The memory 1309 may be configured to store a software program and a module. The processor 1301 runs the software program and the module stored in the memory 1309, to perform various functional applications and data processing of the search apparatus. The memory 1309 may mainly include a program storage area and a data storage area, where the program storage area may store an operating system, an application program required by at least one function (for example, a broadcast function), and the like; and the data storage area may store data created based on use of the search apparatus (for example, a transfer path list) or the like. In addition, the memory 1309 may include a high speed random access memory, and may also include a non-volatile memory, such as at least one magnetic disk storage device, a flash memory, or another volatile solid-state storage device. An invoked program and received data in this embodiment of the invention are stored in the memory 1309. When required to be used, the program and the data are invoked by the processor 1301 from the memory 1309.

The processor 1301 is a control center of the search apparatus, and can perform path search based on the set propagation path search method. The processor 1301 connects each part of the entire search apparatus by using various interfaces and lines, and performs various functions of the search apparatus and processes data by running or executing a software program and/or a module stored in the memory 1309 and invoking data stored in the memory 1309, thereby solving a problem in the prior art of path loss due to an increase in a distance, and improving accuracy of a propagation model.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A propagation path search method, comprising:
    defining a target three-dimensional object, wherein the target three-dimensional object is configured to describe full space;
    setting a signal transmission point in an internal space of the target three-dimensional object to perform initial beam modeling of a signal point source, wherein the signal transmission point is used to transmit an initial beam;
    tracking the initial beam to determine a propagation manner of the initial beam in the target three-dimensional object; and
    determining that a path corresponding to a target beam is an effective path when the target beam reaches a signal receiving point, wherein the target beam is comprised in the initial beam, or is obtained after the initial beam is split or changed.

2. The method according to claim 1, wherein the propagation manner comprises collineation, reflection, diffraction, transmission or scattering.

3. The method according to claim 2, wherein after tracking the initial beam and before determining that a path corresponding to the target beam is an effective path, the method further comprises:
    performing modeling based on the propagation manner.

4. The method according to claim 3, wherein when the propagation manner is diffraction, the performing modeling based on the propagation manner comprises:

obtaining a diffraction face that uses a diffraction edge as a normal line and that passes the signal transmission point;

using a circle that is centered at an intersection of the diffraction edge and the diffraction face and that passes the signal transmission point as a diffraction circle;

transmitting a ray from the signal transmission point through two ends of the diffraction edge to obtain a beam face, wherein the beam face is located on the other side of the signal transmission point relative to the diffraction edge;

moving the signal transmission point on the diffraction circle to obtain infinite corresponding beam faces; and using space formed by the infinite beam faces as space in which a new beam generated after diffraction is located, wherein the new beam generated after diffraction comprises at least one beam.

5. The method according to claim 3, wherein when the propagation manner is reflection, performing the modeling based on the propagation manner comprises:

determining a shielding face, wherein the shielding face is used to reflect a beam transmitted from the signal transmission point;

determining space formed by the beam before reflection as beam space, wherein a contact face between the beam space and the shielding face is an end face of the beam space, and a portion of beam' space on the same side as effective beam space is effective beam' space;

performing space mirroring on the beam space based on the shielding face to obtain the beam' space, wherein a contact face between the beam' space and the shielding face is a start face of the beam' space, and the portion of the beam' space on the same side as the effective beam space is the effective beam' space; and reflecting the beam transmitted by the signal transmission point on the shielding face to obtain reflection space, wherein the reflection space comprises the effective beam space and the effective beam' space.

6. The method according to claim 5, wherein when the propagation manner is transmission, the performing modeling based on the propagation manner comprises:

extending a transmitted beam and intersecting the transmitted beam with a first face of a building, wherein the transmitted beam is a beam of the end face on a second face of the building, the first face and the second face are faces of the building, and the first face and the second face are different faces.

7. The method according to claim 3, wherein when the propagation manner is scattering, the performing modeling based on the propagation manner comprises:

using the initial beam of the signal point source to separately perform modeling on the signal transmission point and the signal receiving point to obtain a scattering face, wherein the scattering face is an intersection set of a signal transmission point model and a signal receiving point model in a visible area of a shielding face;

constructing, based on the signal transmission point and the signal receiving point, a first pyramid and a second pyramid by using the scattering face as a bottom face, wherein the signal transmission point is a vertex of the first pyramid, and the signal receiving point is a vertex of the second pyramid; and determining that space in which the first pyramid is located and space in which the second pyramid is located are space in which a beam after scattering is located.

8. The method according to claim 1, wherein tracking the initial beam to determine a propagation manner of the initial beam in the three-dimensional object comprises:

traversing the initial beam and searching for a leaf node that intersects with the initial beam; and determining a location relationship between the initial beam and a closest facet to determine the propagation manner of the initial beam in the three-dimensional object, wherein the closest facet is a first facet that intersects with the initial beam in space of the leaf node.

9. The method according to claim 8, wherein the location relationship comprises that the initial beam does not intersect with the facet, the beam partially intersects with the facet, and the initial beam completely intersects with the facet.

10. The method according to claim 9, wherein when the location relationship is that the initial beam does not intersect with the facet, after the determining a location relationship between the initial beam and a closest facet, the method further comprises:

determining a location relationship between the initial beam and another facet in the space of the leaf node.

11. The method according to claim 9, wherein when the location relationship is that the initial beam partially intersects with the facet, after the determining a location relationship between the initial beam and a closest facet, the method further comprises:

splitting the initial beam to obtain a non-intersected beam and a first reflected beam generated by an intersected beam;

putting the non-intersected beam and the first reflected beam into a queue, wherein the queue is used to store all to-be-processed beams;

determining whether the initial beam collides with an edge of the facet; and determining to generate a new diffracted beam if the initial beam collides with the edge of the facet.

12. The method according to claim 9, wherein when the location relationship is that the initial beam completely intersects with the facet, after determining a location relationship between the initial beam and a closest facet, the method further comprises:

putting a second reflected beam that is generated by the intersection of the initial beam and the facet into a queue, wherein the queue is used to store all to-be-processed beams;

determining whether the initial beam collides with an edge of the facet; and determining to generate a new diffracted beam if the initial beam collides with the edge of the facet.

13. A search apparatus, comprising a memory and at least one processor, wherein the memory is configured to store a program, and wherein the at least one processor is configured to invoke the program in the memory, wherein the program instructs the at least one processor to:

define a target three-dimensional object, wherein the target three-dimensional object is configured to describe full space; and set a signal transmission point in internal space of the target three-dimensional object to perform initial beam modeling of a signal point source, wherein the signal transmission point is used to transmit an initial beam;

track the initial beam to determine a propagation manner of the initial beam in the target three-dimensional object; and determine that a path corresponding to a target beam is an effective path when the target beam reaches a signal receiving point, wherein the target beam is comprised in the initial beam, or is obtained after the initial beam is split or changed.

14. The search apparatus according to claim 13, wherein the propagation manner comprises collineation, reflection, diffraction, transmission or scattering.

15. The search apparatus according to claim 14, wherein the at least one processor is further configured to:
perform modeling based on the propagation manner.

16. The search apparatus according to claim 15, wherein when the propagation manner is diffraction, the at least one processor is configured to:
obtain a diffraction face that uses a diffraction edge as a normal line and that passes the signal transmission point;
use a circle that is centered at an intersection of the diffraction edge and the diffraction face and that passes the signal transmission point as a diffraction circle;
transmit a ray from the signal transmission point through two ends of the diffraction edge to obtain a beam face, wherein the beam face is located on the other side of the signal transmission point relative to the diffraction edge;
move the signal transmission point on the diffraction circle to obtain infinite corresponding beam faces; and
use space formed by the infinite beam faces as space in which a new beam generated after diffraction is located, wherein the new beam generated after diffraction comprises at least one beam.

17. The search apparatus according to claim 15, wherein when the propagation manner is reflection, the at least one processor is configured to:
determine a shielding face, wherein the shielding face is used to reflect a beam transmitted from the signal transmission point;
determine space formed by the beam before reflection as beam space, wherein a contact face between the beam space and the shielding face is an end face of the beam space, and a portion of beam' space on the same side as effective beam space is effective beam' space;
perform space mirroring on the beam space based on the shielding face to obtain the beam' space, wherein a contact face between the beam' space and the shielding face is a start face of the beam' space, and the portion of the beam' space on the same side as the effective beam space is the effective beam' space; and
reflect the beam transmitted by the signal transmission point on the shielding face to obtain reflection space, wherein the reflection space comprises the effective beam space and the effective beam' space.

18. The search apparatus according to claim 17, wherein when the propagation manner is transmission, the at least one processor is configured to:
extend a transmitted beam and intersect the transmitted beam with a first face of a building, wherein the transmitted beam is a beam of the end face on a second face of the building, the first face and the second face are faces of the building, and the first face and the second face are different faces.

19. The search apparatus according to claim 15, wherein when the propagation manner is scattering, the at least one processor is configured to:
use the initial beam of the signal point source to separately perform modeling on the signal transmission point and the signal receiving point to obtain a scattering face, wherein the scattering face is an intersection set of a signal transmission point model and a signal receiving point model in a visible area of a shielding face;
construct, based on the signal transmission point and the signal receiving point, a first pyramid and a second pyramid by using the scattering face as a bottom face, wherein the signal transmission point is a vertex of the first pyramid, and the signal receiving point is a vertex of the second pyramid; and
determine that space in which the first pyramid is located and space in which the second pyramid is located are space in which a beam after scattering is located.

20. A non-transitory computer-readable storage medium storing instructions, which, when executed by a processor, cause the processor to:
define a target three-dimensional object, wherein the target three-dimensional object is configured to describe full space;
set a signal transmission point in internal space of the target three-dimensional object to perform initial beam modeling of a signal point source, wherein the signal transmission point is used to transmit an initial beam;
track the initial beam to determine a propagation manner of the initial beam in the target three-dimensional object; and
determine that a path corresponding to a target beam is an effective path when the target beam reaches a signal receiving point, wherein the target beam is comprised in the initial beam, or is obtained after the initial beam is split or changed.

* * * * *